United States Patent Office 3,451,766
Patented June 24, 1969

3,451,766
PROCESS FOR CONCENTRATING SODIUM DICHROMATE SOLUTIONS
Heinrich Schafer, Cologne-Flittard, and Paul Henkel and Martin Weist, Leverkusen, Germany, assignors to Farbenfabriken Bayer Aktiengesellschaft, a corporation of Germany
No Drawing. Continuation-in-part of application Ser. No. 280,444, May 14, 1963. This application Oct. 20, 1966, Ser. No. 588,000
Claims priority, application Germany, May 17, 1962, F 36,830
Int. Cl. C01g *37/14*
U.S. Cl. 23—56           15 Claims This is a continuation-in-part application of copending U.S. application Ser. No. 280,444, filed May 14, 1963, now abandoned.

The present invention relates to a process for concentrating dichromate solutions, and more particularly continuously concentrating dichromate solutions by multistage evaporation.

According to known processes, sodium dichromate solutions obtained by acidifying sodium monochromate solutions with sulfuric acid are concentrated in open boilers, For the necessary heat transfer, the boilers are provided with heating coils through which steam is conducted. The concentration is performed in two steps. In the first step the dichromate solution, containing about 400-600 grams per liter $Na_2Cr_2O_7 \cdot 2H_2O$ and 200-300 grams per liter of $Na_2So_4$, is evaporated to a concentration of about 900 grams per liter of $Na_2Cr_2O_7 \cdot 2H_2O$. The sodium sulfate which separates out is then removed and the filtrate, which still contains between about 20-25 grams per liter of sodium sulfate in solution, is again evaporated. In this second step, evaporation is continued up to a final concentration of about 1600 grams per liter of $$Na_2Cr_2O_7 \cdot 2H_2O$$

This solution while still hot is filtered to remove the sodium sulfate precipitated during the second evaporation step. Afterwards this highly concentrated solution, now containing only a small amount of sodium sulfate, is cooled down to crystallize sodium dichromate. After recovering the dichromate crystals, the mother liquor is normally recycled to neutralize raw monochromate solution thereby precipitating alumina as well as silica hydrates.

However, the evaporation of the dichromate solutions rich in sodium sulfate in open boilers as described above has considerable disadvantages, making the process troublesome and uneconomical. The sodium sulfate precipitated during the evaporation steps forms deposits on the heating coils which are disposed in the open boilers in contact with the solution, thus inhibiting optimum heat transfer. Although part of the deposit breaks off from the heating coils on discharging or charging of the boilers, part of the deposit forms a strongly adherent scale which grows larger in the course of the repeated evaporation steps. Therefore, at least weekly the boiler and heating coils must be cleaned with hot water and sometimes even by mechanical treatment to remove the scales which have meanwhile built up. Furthermore, the process cannot be performed continuously and the energy consumption is high, as the heat from the vapors escaping from the open boilers is not utilized.

Many attempts have been made to overcome the difficulties described above. It has heretofore been proposed to evaporate alkali dichromate solutions contaminated with alkali metal sulfate impurities to about 1192 grams per liter of dichromate (i.e., 60° Baumé), thereafter removing the major part of the alkali metal sulfate by filtration and precipitating the remaining part by cooling the liquor to a temperature below 20° F. This known process, however, does not avoid the scale formation while evaporating the dilute dichromate solution to the above-mentioned concentration of about 1192 grams per liter $Na_2Cr_2O_7 \cdot 2H_2O$.

Theoretically, the concentration of dichromate solutions should be performed more economically by using a multi-stage evaporator. In these evaporators the solutions to be concentrated are passed through tubes, which are heated indirectly by steam in a closed system. Two or more of these evaporators are usually series-connected in such a way that the vapors generated in a foregoing evaporator are utilized in the next following one. However, on feeding dilute sodium dichromate solutions into such a multi-stage evaporator, it was found that the tubes became clogged after only operating for several hours, and the process had to be interrupted.

It is an object of the present invention to overcome the foregoing disadvantages and to provide a more efficient process for concentrating dilute sodium dichromate solutions, particularly those containing high sodium sulfate contents, and especially a continuous process for such purpose.

It is another object of the present invention to provide a process for concentrating by multi-stage evaporation dilute sodium dichromate solutions, especially those obtained by the reaction of sodium monochromate solutions with sulfuric acid.

It is still another object of the present invention to provide a process for concentrating dilute dichomate solutions in a manner which avoids any scale formation on the attendant apparatus which is normally caused by precipitated sodium sulfate.

It is a further object of the present invention to provide a process for concentrating in an evaporating apparatus dilute sodium dichromate solutions without separating off the attendant sodium sulfate before or while carrying out the evaporation.

Other and further objects of the present invention will become apparent from the within specification and accompanying examples.

It has now been found in accordance with the present invention that a continuous process may be provided for concentrating sodium dichromate solutions which have been obtained by the reaction of sodium monocromate solutions with sulfuric acid, which process avoids the foregoing prior art disadvantages. Broadly, the instant process consists in adjusting the concentration of dilute sodium dichromate solutions which contain up to 600 g./l. of $Na_2Cr_2O_7 \cdot 2H_2O$ and up to 300 g./l. of $Na_2SO_4$ to an enriched concentration of about 800 g./l. of $Na_2Cr_2O_7 \cdot 2H_2O$ or more, i.e., up to 1600 g./l., by adding concentrated sodium dichromate solutions thereto, whereby the precipitated sodium sulfate formed can be separated completely or partially or be left in the solution, and the solution or suspension obtained thereafter be concentrated by evaporation in a multi-stage evaporator.

Advantageously, in accordance with the instant process, no incrustations are formed on the boiling tubes of the evaporator. Evaporation therefore can be carried out in a multi-stage evaporator without interruption and the water evaporated as steam in the first evaporation stage can be utilized in the following stage or stages to conserve the overall steam requirement for the evaporation.

It is another advantage of the instant process that the precipitated sodium sulfate impurities are obtained in a form which may be easily removed by filtration or decantation and the sodium sulfate precipitated can readily be separated off from adherent dichromate solution by washing with water. Finally as the sodium dichromate solutions obtained are relatively pure a pure solid sodium dichromate may be obtained. The process produces high yields as there are only small losses of sodium dichromate in removing the sodium sulfate and the pure sodium dichromate solution can be crystallized almost completely.

Normally, the starting solutions suitable for the multi-stage evaporation are prepared by adjusting the concentration of initially dilute sodium dichromate solutions, usually obtained by the reaction of sodium monochromate solutions with sulfuric acid and containing about 400–600 grams per liter of $Na_2Cr_2O_7 \cdot 2H_2O$ and 200–300 grams per liter of $Na_2SO_4$, to an enriched concentration of about 800–1450 grams per liter, preferably 1100–1450 grams per liter, of $Na_2Cr_2O_7 \cdot 2H_2O$ by adding to the diluted dichromate solution a sufficient amount of a highly concentrated dichromate enriching solution containing more than 800 grams per liter, such as about 850–1600 grams per liter, preferably about 1200–1600 grams per liter, and most preferably about 1500–1600 grams per liter, of $Na_2Cr_2O_7 \cdot 2H_2O$.

Of course, the quantity as well as the concentration of the added highly concentrated dichromate enriching solution must be sufficient for the given starting dilute solution to obtain a resultant enriched solution containing at least 800 grams per liter of $Na_2Cr_2O_7 \cdot 2H_2O$. Thus, the dichromate concentration of the resultant enriched solution is particularly dependent upon the quantity and concentration of the enriching solution or liquor used. To avoid the addition of large quantities of the concentrated enriching liquor and to obtain the maximum benefits of the instant process, such enriching liquors are used for the adjustment which have as high a concentration as conveniently possible, that is, most preferably heat saturated dichromate enriching solutions containing about 1500–1600 grams per liter of $Na_2Cr_2O_7 \cdot 2H_2O$.

Additionally, sulfate contaminated dilute dichromate solutions having a concentration of less than 400 grams per liter of $Na_2Cr_2O_7 \cdot 2H_2O$, such as the washing waters obtained in the manufacture of dichromate, and having a concentration of for example 150–400 grams per liter of dichromate and 75–200 grams per liter of sulfate, can be worked up in the same way most economically, especially by using said heat saturated enriching solutions for the adjusting and thence concentrating in a multi-stage evaporator.

On adjusting the dilute dichromate solutions, for instance to enriched concentrations of about 850 grams per liter, of $Na_2Cr_2O_7 \cdot 2H_2O$ by enriching solution addition, advantageously the main part of the sodium sulfate is precipitated, with only about 24 grams per liter remaining in solution.

A certain amount of the highly concentrated sodium dichromate solution which preferably contains 1600 g./l. of $Na_2Cr_2O_7 \cdot 2H_2O$, produced in the evaporator plant is removed for the preparation of the starting solution. The remainder is worked up into crystals in known manner.

Surprisingly it has further been found that it is immaterial for a satisfactory uninterrupted evaporating process whether the sodium sulfate, precipitated when mixing the solution, is only partially separated before or between the steps of the evaporation process, or whether it is left completely in the solution to be concentrated.

By this performance of the instant new process it is possible to evaporate sulfate containing solutions of sodium dichromate at a concentration beginning at 800 g./l. $Na_2Cr_2O_7 \cdot 2H_2O$ in a continuous process to the concentration desired. In this embodiment of the instant new process the dilute solution of sodium dichromate may be mixed with the recycled concentrated solution directly before entering the evaporator.

As it was surprisingly found that the multi-stage evaporation can be carried out with or without first removing the precipitated sodium sulfate, the further concentration up to saturated dichromate solution can be performed by various embodiments of the present invention.

In accordance with one such embodiment, the adjusted solution can be separated from the solid sulfate by filtration or decantation before evaporation. Upon subsequent evaporation, part of the concentrated solution containing about 1600 grams per liter of $Na_2Cr_2O_7 \cdot 2H_2O$ is then hot filtered to remove the intermediately precipitated sodium sulfate impurities. The hot filtered solution perhaps containing only about 4 grams per liter sulfate in solution is then cooled to crystallize and recover sodium dichromate in pure condition. The other part of the hot dichromate solution, preferably without filtering, is recycled as enriching solution to adjust the dilute starting solution.

It is, however, possible in accordance with other embodiments of the invention to evaporate the enriched dichromate liquor containing the suspended sodium sulfate without first removing such sulfate solids, or to evaporate such liquor after separating off only a part of such solids. In case a part of the solids is separated off prior to evaporation, the recycled dichromate solution need not be filtered since the sodium sulfate level thereof in accordance with the instant process can be kept conveniently at a desired constant level by removing, as said part, that amount of precipitated sulfate which is brought into the system with the dilute starting solution.

Furthermore, if the adjusted dichromate solutions are to be used per se, i.e., without subsequent cooling of the evaporated solutions to obtain dichromate crystals, then a part of the adjusted solution can be separated off together with the suspended sodium sulfate therein. Such adjusted solutions may for example have a concentration of about 800–900 grams per liter of $Na_2Cr_2O_7 \cdot 2H_2O$. Under these circumstances, this separated part can be kept so high that the remaining amount of dichromate solution which is evaporated is only that necessary for providing enriching solution or liquor for the adjustment of the dilute solution. This adjusting dichromate liquor can then be fed in a recycle process without removal of the sulfate solids, as the corresponding excess sulfate is separated off together with the part of the enriched solution to be used per se. Such enriched solution to be used per se may in fact be used for example as oxidizing agent or starting material for the production of chromic acid anhydride.

The adjustment of the dilute dichromate solution or liquor by the addition thereto of the enriching dichromate solution or liquor can be carried out conveniently in mixing and decanting vessels preconnected to the evaporation stage. It is, however, even possible to mix the dilute and enriched dichromate solutions in an appropriate manner just before or while entering the evaporator system, for example in a premixing inlet conduit for the multi-stage evaporator.

Therefore, in accordance with the present invention a process for concentrating sodium dichromate solution has been obtained by the reaction of sodium monochromate solution with sulfuric acid may now be provided, which comprises adjusting sodium dichromate dilute solution containing up to about 600 g./l. of $Na_2Cr_2O_7 \cdot 2H_2O$ and up to about 300 g./l. of $Na_2SO_4$ to an enriched concentration of at least about 800 g./l. of $Na_2Cr_2O_7 \cdot 2H_2O$ to precipitate concomitantly a substantial portion of the $Na_2SO_4$ content thereof by the step of adding to said dilute solution more highly concentrated sodium dichromate enriching solution having a concentration correspondingly substantially above 800 g./l. of $$Na_2CR_2O_7 \cdot 2H_2O$$

in an amount sufficiently to provide in the resultant enriched solution said concentration of at least about 800 g./l. of $Na_2Cr_2O_7 \cdot 2H_2O$, concentrating resultant enriched solution obtained from the adding step by the step of evaporating such obtained resultant solution to precipitate concomitantly the remainder substantially of the $Na_2SO_4$ content thereof, and recovering so-evaporated resultant solution from the evaporating step.

Particularly, part or all of the resultant enriched solution from the adding step may be concentrated by the evaporating step. The so-evaporated resultant solution may be recovered conveniently thereafter. The recovered so-evaporated resultant solution may then be subjected in whole or in part to cooling after separating out the precipitated sodium sulfate to isolate the desired dichromate content in crystalline form, and/or in whole or in part such so-evaporated resultant solution may be recycled to the adding step as all or part of the more highly concentrated sodium dichromate enriching solution. In the latter instance, a part of the resultant enriched solution may be recovered without evaporation for use per se with or without prior separation of attendant precipitated sodium sulfate. In this manner, an amount of sodium sulfate corresponding to that in the initial dilute solution to be adjusted may be removed as attendant precipitated sodium sulfate in the resultant enriched solution recovered for use per se without undergoing the evaporating step.

In the event no resultant enriched solution is recovered prior to the evaporating step, then, of course, at least a portion of the so-evaporated resultant solution will be recovered for cooling the same to effect crystallization of the dichromate content thereof. As aforesaid, whether a portion of resultant enriched solution obtained from the adding step is recovered per se without undergoing the evaporating step, or whether all of such resultant enriched solution does undergo the evaporating step, at least a portion of such resultant enriched solution will undergo the evaporating step to provide in the preferred case enriched solution for recycling to the adding step and/or enriched solution for cooling to recover dichromate crystals.

Indeed, the foregoing steps will preferably be carried out in a continuous manner and the evaporating step in particular will preferably be carried out by a multi-stage evaporation in a multi-stage evaporator having two or more stages, such as two to five stages.

Generally, the dilute solution contains substantially between about 150 and 600 g./l. of $Na_2Cr_2O_7 \cdot 2H_2O$ and substantially between about 75 and 300 g./l. of $Na_2SO_4$, and the enriching solution has a concentration substantially above 800 and up to 1600 g./l. of $Na_2Cr_2O_7 \cdot 2H_2O$ and contains, regardless of any amount of $Na_2SO_4$ present in solid suspension form, at most only residual amounts of about 30 to 5 or 10 to 5 or even up to about 5 g./l. of $Na_2SO_4$ in dissolved form, whereby said resultant enriched solution prior to the evaporating step will have a concentration of substantially between about 800 and 1450 g./l. of $Na_2Cr_2O_7 \cdot 2H_2O$.

In accordance with one particular feature of the invention, wherein at least a part of the recovered so-evaporated resultant solution is separated from attendant precipitated $Na_2SO_4$ to provide a separated solution substantially free from attendant precipitated $Na_2SO_4$, advantageously one part of the recovered so-evaporated and so-separated resultant solution substantially free from attendant precipitated $Na_2SO_4$ may be subjected to cooling to effect crystallization substantially of the

content thereof and in the same way another part of the recovered so-evaporated and so-separated resultant solution substantially free from attendant precipitated $Na_2SO_4$ may be recycled to the adding step as more highly concentrated sodium dichromate enriching solution.

In accordance with another feature of the present invention, at least a part of the recovered so-evaporated resultant solution still containing precipitated $Na_2SO_4$ therein is recycled to the adding step as more highly concentrated sodium dichromate enriching solution.

Advantageously, therefore, the precipitated sodium sulfate content in the resultant enriched solution may be removed completely or partially therefrom before the evaporating step or left completely therein as a suspension during the evaporating step. This is true regardless of whether all of the evaporated resultant enriched solution is to be recycled to the adding step or to be recovered for cooling to crystallize the dichromate content therefrom or is to be used per se. Usually, where some or all of the so-evaporated resultant enriched solution is recycled, removal of attendant precipitated sodium sulfate may take place completely or partially before the evaporating step and/or after such step, or not at all as for instance where a portion of the resultant enriched solution is removed from the system together with attendant precipitated sodium sulfate without undergoing the evaporating step. Indeed, the artisan will appreciate that the rate of direct recovery of such resultant enriched solution from the adding step without undergoing the evaporating step may be adjusted to remove, at this point, a quantity of sodium sulfate corresponding to that present in the initial dilute sodium dichromate solution to be adjusted in the adding step.

From the foregoing, it will be clear that the present invention permits the production of a more concentrated sodium dichromate solution, irrespective of the content of sodium sulfate therein and irrespective of the form of such sulfate, i.e., either in solution or in precipitated or suspended condition, by a continuous process such that the resultant adjusted enriched solution may be recovered per se or recovered after undergoing evaporation, so long as at least a portion of the adjusted resultant enriched solution does undergo the evaporating step, in the one case, to provide enriching solution for recycling to the adding step and, in the other case, to provide as well so-evaporated enriched solution for use per se or for undergoing cooling to produce dichromate crystals. The crux of the present invention is in being able to attain the foregoing by process conditions which permit the use of a multistep evaporator through which at least a part of the resultant enriched solution must be passed, yet without clogging of such multi-stage evaporator as would otherwise occur utilizing prior art techniques. In essence, suspended sodium sulfate in the solution undergoing evaporation in the multi-stage evaporator does not in any way cause deposits or scale build-up within the flow paths or flow tubes of the evaporator apparatus. Versatility in manipulations is accordingly made possible, since separation of precipitated sodium sulfate need not take place before passage of the solution to the multi-stage evaporator and/or if desired, the separation may be carried out by merely decanting solution from attendant sludge rather than by a full and complete filtration operation.

The following examples are set forth by way of illustration and not limitation to demonstrate the concept of the present invention.

EXAMPLE 1

A sodium dichromate solution containing 400 g./l. of $Na_2Cr_2O_7 \cdot 2H_2O$ and 200 g./l. of $Na_2SO_4$ and a highly concentrated solution containing about 1600 g./l. of $Na_2Cr_2O_7 \cdot 2H_2O$ were continuously introduced into a vessel of 10 cubic meters capacity fitted with a stirrer. When the less concentrated solution is supplied continuously the addition of the highly concentrated solution is automatically controlled according to the specific gravity of the liquid in the container so that the specific gravity remains at a value of about 1.5 g./cc., corresponding to about 900 g./l. of $Na_2Cr_2O_7 \cdot 2H_2O$. The sodium dichromate solution leaving the vessel with the stirrer is freed from the larger part of the precipitated sodium sulfate and concentrated in a two-stage evaporator plant to the required final concentration of about 1600 g./l. of $Na_2Cr_2O_7 \cdot 2H_2O$. A part of the highly concentrated solution so obtained is returned to the process and serves for the adjustment of the less concentrated solution to a contration of about 900 g./l. of $Na_2Cr_2O_7 \cdot 2H_2O$.

EXAMPLE 2

The sodium dichromate solution prepared in the same apparatus and in the same way as described in Example 1 is evaporated to 1600 g./l. of $Na_2Cr_2O_7 \cdot 2H_2O$ in a two-stage evaporator plant without the sodium sulfate being first removed. The suspended sodium sulfate is separated off and the highly concentrated sodium dichromate solution is returned to the vessel equipped with stirrer and is partly crystallized.

EXAMPLE 3

(i) Prior art method without separation of solid sulfate before evaporation

A dilute sodium dichromate solution ($a_1$) containing 400 g./l. of $Na_2Cr_2O_7 \cdot 2H_2O$ and 200 g./l. of $Na_2SO_4$ (including 145 g./l. in solution and 55 g./l. in the form of a precipitate suspension) was fed into the tubes of a two stage-evaporator of pilot-plant-dimensions. After 8 hours the tubes of the evaporator were completely clogged by sodium sulfate deposits, thus causing interruption of the evaporation.

(ii) Prior art method with separation of solid sulfate before evaporation

The procedure under (i) above was repeated, but in this case the dilute dichromate solution ($a_1$) containing 400 g./l. $Na_2Cr_2O_7 \cdot 2H_2O$ was filtered before being evaporated, so that only 145 g./l. $Na_2SO_4$ remained in solution. The filtered solution was fed into a two-step evaporator as described under (i). After 10 hours the run had to be interrupted as the tubes were completely clogged by sodium sulfate scale. The deposits were very hard and strongly adhered to the tube wall and could not be removed.

(iii) Method of invention with partial separation of solid sulfate before evaporation A dilute sodium dichromate solution ($a_1$) containing 400g./l. of $Na_2Cr_2O_7 \cdot 2H_2O$ and 200 g./l. of $Na_2SO_4$ (including 145 g./l. in solution and 55 g./l. in the form of a precipitate suspension) and a highly concentrated enriching solution ($b_1$) containing 1550 g./l. of

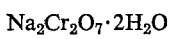

$$Na_2Cr_2O_7 \cdot 2H_2O$$

and 200 g./ l. of $Na_2SO_4$ (including 4 g./l. in solution and 196 g./l. in the form of a precipitate suspension) were continuously introduced into a vessel of 10 cubic meters capacity fitted with a stirrer. The addition of the highly concentrated enriching solution ($b_1$) was automatically controlled according to the specific gravity of the liquid in the vessel so that the specific gravity was maintained at a value of about 1.5 g./cm.³ corresponding to about 900 g./l. of $Na_2Cr_2O_7 \cdot 2H_2O$. The resultant enriched sodium dichromate solution ($c_{1,0}$) leaving the vessel contained 910 g./l. of $Na_2Cr_2O_7 \cdot 2H_2O$ and 200 g./l. of $Na_2SO_4$ (including 22 g./l. in solution and 178 g./ l. in the form of a precipitate suspension).

Solution ($c_{1,0}$) was freed from part of the sodium sulfate by decanting and filtering. The decanted solution ($c_{1,1}$) contained 910 g./l. of $Na_2Cr_2O_7 \cdot 2H_2O$ and 136 g. of $Na_2SO_4$ (including 22 g./l. in solution and 114 g./l. in the form of a precipitate suspension). The sludge remaining after decantation was filtered, the solid $Na_2SO_4$ content was removed and the filtrate ($c_{1,2}$) containing 910 g./l. of $Na_2Cr_2O_7 \cdot 2H_2O$ and 22 g./l. of $Na_2SO_4$ in solution was fed together with decanted solution ($c_{1,1}$) into a two-stage-evaporator plant having boiler tube evaporator surfaces. After evaporation, the concentrated solution ($d_1$) had a concentration corresponding to that of the highly concentrated enriching solution ($b_1$) [i.e., 1550 g./l. of $Na_2Cr_2O_7 \cdot 2H_2O$ and 200 g./l. of $Na_2SO_4$ (including 4 g./l. in solution and 196 g./l. in the form of a precipitate suspension)] which was being continuously introduced into the vessel with the dilute dichromate solution ($a_1$). Part of solution ($d_1$) was returned as solution ($b_1$) serving for the enrichment of solution ($a_1$). The other part was used for the production of solid $Na_2Cr_2O_7 \cdot 2H_2O$. During evaporation no scale formation occurred on the interior surfaces of the boiler tubes even after 2 years' operation on a technical scale, and thus no interruption of the operation was necessary for removing sodium sulfate deposits. Also, as compared with prior art open boiler evaporation techniques, the foregoing process requires only about half as much steam.

(iv) Method of invention without separation of solid sulfate before evaporation

The procedure of (iii) above was repeated, but in this case using a dilute dichromate solution ($a_2$) containing 400 g.//l. of $Na_2Cr_2O_7 \cdot 2H_2O$ and 205 g./l. of $Na_2SO_4$ (including 145 g./l. in solution and 60 g./l. in the form of a precipitate suspension), the enriching highly concentrated solution ($b_2$) used therewith having a concentration of 1590 g./l. of $Na_2Cr_2O_7 \cdot 2H_2O$ and 4 g./l. $Na_2SO_4$ (the latter being entirely present in solution). The resultant enriched solution ($c_2$) had a concentration of 895 g./l. $Na_2Cr_2O_7 \cdot 2H_2O$ and 121 g./l. $Na_2SO_4$ (including 23 g./l. in solution and 98 g./l. in the form of a precipitate suspension). Upon concentration of the enriched solution in the two-stage evaporator plant in the same manner as under (iii) above but in this case without separating the precipitate suspension, the obtained concentrated evaporated solution ($d_2$) had a concentration of 1590 g./l. $Na_2Cr_2O_7 \cdot 2H_2O$ and 214 g./l. $Na_2SO_4$ (including 4 g./l. in solution and 210 g./l. in the form of a precipitate suspension). In this case as well, the evaporated solution ($d_2$) had a concentration corresponding to that of the enriching highly concentrated solution ($b_2$) added to the dilute dichromate solution ($a_2$), subject to the prior separation by filtration of the 210 g./l. of $Na_2SO_4$ precipitate therein. During the evaporation no scale formation occurred on the interior surfaces of the boiler tubes of the evaporator plant, even after 2 months of operation.

(v) Method of invention with complete separation of solid sulfate before evaporation The procedure of (iii) above was repeated, but in this case using a dilute dichromate solution ($a_3$) containing 420 g./l. of $Na_2Cr_2O_7 \cdot 2H_2O$ and 210 g./l. of $Na_2SO_4$ (including 135 g./l. in solution and 75 g./l. in the form of a precipitate suspension), the enriching highly concentrated solution ($b_3$) used therewith having a concentration of 1610 g./l. of $Na_2Cr_2O_7 \cdot 2H_2O$ and 4 g./l. of $Na_2SO_4$ (the latter being entirely present in solution). The resultant enriched solution ($c_3$) had a concentration of 920 g./l. $Na_2Cr_2O_7 \cdot 2H_2O$ and 124 g./l. $Na_2SO_4$ (including 22 g./l. in solution and 102 g./l. in the form of a precipitate suspension). Upon concentration of the enriched solution in the two-stage evaporator plant in the same manner as in (iii) above but in this case after filtration of the 102 g./l. of suspended $Na_2SO_4$, the obtained concentrated evaporated solution ($d_3$) had a concentration of 1610 g./l. of $Na_2Cr_2O_7 \cdot 2H_2O$ and 39 g./l. of $Na_2SO_4$ (including 4 g./l. in solution and 35 g./l. in the form of a precipitate suspension). In this case as well, the evaporated solution ($d_3$) had a concentration corresponding to that of the enriching highly concentration solution ($b_3$) added to the dilute dichromate solution ($a_3$), subject to the prior separation by filtration of the 35 g./l. of $Na_2SO_4$ precipitate therein. During the evaporation no scale formation occurred on the interior surfaces of the boiler tubes of the evaporator plant, even after 1 month of operation.

(vi) Method of invention without separation of solid sulfate before evaporation

The procedure of (iii) above was repeated, in this case using a dilute dichromate solution ($a_4$) containing 400 g./l. of $Na_2Cr_2O_7 \cdot 2H_2O$ and 200 g./l. of $Na_2SO_4$ (including 145 g./l. in solution and 55 g./l. in the form of a precipitate suspension), the enriching highly concentrated solution ($b_4$) used therewith having a concentration of 1600 g./l. of $Na_2Cr_2O_7 \cdot 2H_2O$ and 800 g./l. of $Na_2SO_4$ (including 4 g./l. in solution and 796 g./l. in the form of a precipitate suspension). The resultant enriched solution ($c_4$) had a concentration of 850 g./l. of $Na_2Cr_2O_7 \cdot 2H_2O$ and 425 g./l. of $Na_2SO_4$ (including 24 g./l. in solution and 401 g./l. in the form of a precipitate suspension). Upon concentration of the enriched solution in the two-stage evaporator plant in the same manner as in (iii) above, the obtained concentrated evaporated solution ($d_4$) had a concentration of 1600 g./l. of $Na_2Cr_2O_7 \cdot 2H_2O$ and 800 g./l. of $Na_2SO_4$ (including 4 g./l. in solution and 796 g./l. in the form of a precipitate suspension). During the evaporation no scale formation occurred on the interior surfaces of the boiler tubes of the evaporator plant, even after 2 months of operation.

In order to establish clearly the fact that in accordance with the invention the addition of the enriching highly concentration solution (b) to the dilute dichromate solution (a) serves to precipitate substantially completely the content of sodium sulfate present under procedures (iii), (iv), (v) and (vi), the following table is set forth. From such table it can be seen that in the enriched solution (c) obtained, prior to evaporation, substantially all of the sodium sulfate is in precipitated form, the low content of sodium sulfate remaining in solution being insufficient to cause incrustations during the subsequent evaporation by reason of the deposition thereof in the form of scales on the boiling tubes.

TABLE
[Concentration of $Na_2Cr_2O_7 \cdot 2H_2O$ and $Na_2SO_4$ in grams/liter] [1]

|  | (iii) | (iv) | (v) | (vi) |
|---|---|---|---|---|
| (a) Dilute solution prior to enriching solution addition. | 400 Cr<br>145 Ss<br>55 Sp | 400 Cr<br>145 Ss<br>60 Sp | 420 Cr<br>135 Ss<br>75 Sp | 400 Cr<br>145 Ss<br>55 Sp |
| (b) Concentration of enriching solution added. | 1,550 Cr<br>4 Ss<br>196 Sp | 1,590 Cr<br>4 Ss | 1,610 Cr<br>4 Ss | 1,600 Cr<br>4 Ss<br>796 Sp |
| (c) Concentration of enriched solution obtained. | 910 Cr<br>22 Ss<br>178 Sp | 895 Cr<br>23 Ss<br>98 Sp | 920 Cr<br>22 Ss<br>102 Sp | 850 Cr<br>24 Ss<br>401 Sp |

[1] Cr-$Na_2Cr_2O_7 \cdot 2H_2O$; Ss=$Na_2SO_4$ in solution; Sp=$Na_2SO_4$ as precipitate.

EXAMPLE 4

The procedure of Example 1 is repeated except that a part of the adjusted sodium dichromate solution leaving the vessel is recovered per se. This adjusted dichromate solution contains only about 22 g./l. of $Na_2SO_4$ dissolved therein and correspondingly attendant sodium sulfate precipitate suspended therein. The remainder of the adjusted sodium dichromate solution leaving the vessel is concentrated in the two-stage evaporator plant to the required final concentration of about 1600 g./l. of $Na_2Cr_2O_7 \cdot 2H_2O$, without first removing any precipitated sodium sulfate therefrom as was carried out in Example 1. The highly concentrated dichromate solution so obtained after the evaporation and still containing attendant precipitated sodium sulfate therein is returned to the adjusting vessel as highly concentrated enriching solution used to adjust or enrich incoming dilute solution. None of the solution so obtained after the evaporation is recovered for crystallizing dichromate therefrom. The part of adjusted solution leaving the vessel and which is recovered in an amount sufficient to remove therewith attendant solid and dissolved sodium sulfate and sodium bichromate in a quantity equal to the sodium sulfate respectively sodium bichromate entering the vessel with the dilute solution to be treated. Accordingly, no removal of solid sodium sulfate from the remainder of the adjusted solution is necessary either before or after evaporation, or before recycling, as sufficient sodium sulfate is removed from the system in precipitated or suspended form with the adjusted solution recovered per se to balance the sodium sulfate content in the incoming dilute solution.

Balance—at a recovery from the system of 1 part by volume of adjusted solution for use per se.

The following flow scheme gives the amount of solutions A, B, C and D, which have to be mixed and which are recovered in parts by volume:

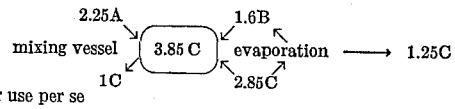

2.25 parts by volume of solution A and 1.6 parts by volume of solution B are mixed to yield 3.85 parts by volume of solution C. 1 part by volume of solution C is taken out for use per se. 2.85 parts of solution C are evaporated to yield 1.6 parts of solution B and 1.25 parts of solution D. The 1.6 parts of solution B are returned to the mixing vessel. The composition of solution A, B, C and D is as follows:

A. Dilute solution:                        G./l.
    $Na_2Cr_2O_7 \cdot 2H_2O$ _____ 400
    $Na_2SO_4$ _____ [1] 200
B. Enriching solution:
    $Na_2Cr_2O_7 \cdot 2H_2O$ _____ 1600
    $Na_2SO_4$ _____ [2] 900
C. Adjusted solution:
    $Na_2Cr_2O_7 \cdot 2H_2O$ _____ 900
    $Na_2SO_4$ _____ [3] 450
D. Evaporated water.

[1] 145 g./l. in solution, 55 g./l. in suspension.
[2] 4 g./l. in solution, 896 g./l. in suspension.
[3] 22 g./l. solution, 428 g./l. in suspension.

From the part of solution C which is recovered for use per se the sodium sulfate present in suspension may be removed by filtration. This results in a solution containing 900 g./l. of $Na_2Cr_2O_7 \cdot 2H_2O$ and 22 g./l. of $Na_2SO_4$. This solution is usable as oxidizing agent or as starting material for the production of chromium salts or chromium acid anhydrate either after separation of the suspended sodium sulfate or still containing the suspended sodium sulfate.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Process for concentrating sodium dichromate solution which has been obtained by the reaction of sodium monochromate solution with sulfuric acid, which comprises adjusting sodium dichromate dilute solution containing up to about 600 g./l. of $Na_2Cr_2O_7 \cdot 2H_2O$ and up to about 300 g./l. of $Na_2SO_4$ to an enriched concentration of at least about 800 g./l. of $Na_2Cr_2O_7 \cdot 2H_2O$ to precipitate concomitantly a substantial portion of the $Na_2SO_4$ content thereof by the step of adding to said dilute solution more highly concentrated sodium dichromate enriching solution having a concentration correspondingly substantially above 800 g./l. of $Na_2Cr_2O_7 \cdot 2H_2O$ in an amount sufficient to provide in the resultant enriched solution said concentration of at least about 800 g./l. of $Na_2Cr_2O_7 \cdot 2H_2O$, concentrating resultant enriched solution obtained from the adding step by the step of evaporating such obtained resultant solution to precipitate concomitantly the remainder substantially of the $Na_2SO_4$ content thereof, and recovering so-evaporated resultant solution from the evaporating step.

2. Continuous process according to claim 1 for concentrating sodium dichromate solution which has been obtained by the reaction of sodium monochromate solution with sulfuric acid, which comprises continuously adjusting sodium dichromate dilute solution containing up to about 600 g./l. of $Na_2Cr_2O_7 \cdot 2H_2O$ and up to about 300 g./l. of $Na_2SO_4$ to an enriched concentration of at least about 800 g./l. of $Na_2Cr_2O_7 \cdot 2H_2O$ to precipitate concomitantly a substantial portion of the $Na_2SO_4$ content thereof by the step of continuously adding to said dilute solution more highly concentrated sodium dichromate enriching solution having a concentration correspondingly substantially above 800 g./l. of $Na_2Cr_2O_7 \cdot 2H_2O$ in an amount sufficient to provide in the resultant enriched solution said concentration of at least about 800 g./l. of $Na_2Cr_2O_7 \cdot 2H_2O$, continuously concentrating resultant enriched solution obtained from the adding step by the step of continuously evaporating such obtained resultant solution to precipitate concomitantly the remainder substantially of the $Na_2SO_4$ content thereof, and continuously recovering so-evaporated resultant solution from the evaporating step.

3. Process according to claim 2 wherein said dilute solution contains substantially between about 150 and 600 g./l. of $Na_2Cr_2O_7 \cdot 2H_2O$ and substantially between about 75 and 300 g./l. of $Na_2SO_4$, and wherein said enriching solution has a concentration substantially above 800 and up to 1600 g./l. of $Na_2Cr_2O_7 \cdot 2H_2O$, whereby said resultant enriched solution prior to the evaporation step will have a concentration of substantially between about 800 and 1450 g./l. of $Na_2Cr_2O_7 \cdot 2H_2O$.

4. Process according to claim 3 wherein the evaporating step is carried out by a multi-stage evaporation.

5. Process according to claim 4 wherein at least a part of the recovered so-evaporated resultant solution is separated from attendant precipitated $Na_2SO_4$ to provide a separated solution substantially free from attendant precipitated $Na_2SO_4$.

6. Process according to claim 5 wherein one part of the recovered so-evaporated and so-separated resultant solution substantially free from attendant precipitated $Na_2SO_4$ is subjected to cooling to effect crystallization substantially of the $Na_2Cr_2O_7 \cdot 2H_2O$ content thereof, and wherein another part of the recovered so-evaporated and so-separated resultant solution substantially free from attendant precipitated $Na_2SO_4$ is recycled to the adding step as more highly concentrated sodium dichromate enriching solution.

7. Process according to claim 4 wherein at least a part of the recovered so-evaporated resultant solution still containing precipitated $Na_2SO_4$ therein is recycled to the adding step as more highly concentrated sodium dichromate enriching solution.

8. Process according to claim 4 wherein the precipitated $Na_2SO_4$ content in the resultant enriched solution is removed completely therefrom before the evaporating step.

9. Process according to claim 4 wherein the precipitated $Na_2SO_4$ content in the resultant enriched solution is removed partially therefrom before the evaporating step.

10. Process according to claim 4 wherein the precipitated $Na_2SO_4$ content in the resultant enriched solution is left completely therein as a suspension during the evaporating step.

11. Process according to claim 4 wherein said dilute solution contains substantially between about 400 and 600 g./l. of $Na_2Cr_2O_7 \cdot 2H_2O$ and substantially between about 200 and 300 g./l. of $Na_2SO_4$, and wherein said enriching solution has a concentration of substantially between about 1200 and 1600 g./l. of $Na_2Cr_2O_7 \cdot 2H_2O$ and contains at most only residual amounts of $Na_2SO_4$ in dissolved form up to about 10 to 5 g./l. of $Na_2SO_4$, whereby said resultant enriched solution prior to the evaporating step will have a concentration of substantially between about 1100 and 1450 g./l. of $Na_2Cr_2O_7 \cdot 2H_2O$.

12. Process according to claim 11 wherein said enriching solution has a concentration of about 1600 g./l. of $Na_2Cr_2O_7 \cdot 2H_2O$, wherein the precipitated $Na_2SO_4$ content in the resultant enriched solution is removed partially therefrom before the evaporating step, wherein the so-evaporated resultant solution from the evaporating step has a concentration of about 1600 g./l. $Na_2Cr_2O_7 \cdot 2H_2O$, wherein at least a part of the recovered so-evaporated resultant solution is separated from attendant precipitated $Na_2SO_4$ to provide a separated solution substantially free from attendant precipitated $Na_2SO_4$, wherein one part of the recovered so-evaporated and so-separated resultant solution substantially free from attendant precipitated $Na_2SO_4$ is subjected to cooling to effect crystallization substantially of the $Na_2Cr_2O_7 \cdot 2H_2O$ content thereof, and wherein another part of the recovered so-evaporated and so-separated resultant solution substantially free from attendant precipitated $Na_2SO_4$ is recycled to the adding step as more highly concentrated sodium dichromate enriching solution.

13. Process according to claim 11 wherein said enriching solution has a concentration of about 1600 g./l. of $Na_2Cr_2O_7 \cdot 2H_2O$, wherein the precipitated $Na_2SO_4$ content in the resultant enriched solution is left completely therein as a suspension during the evaporating step, wherein the so-evaporated resultant solution from the evaporating step has a concentration of about 1600 g./l.

$$Na_2Cr_2O_7 \cdot 2H_2O$$

wherein at least a part of the recovered so-evaporated resultant solution is separated from attendant precipitated $Na_2SO_4$ to provide a separated solution substantially free from attendant precipitated $Na_2SO_4$, wherein one part of the recovered so-evaporated and so-separated resultant $Na_2SO_4$ is subjected to cooling to effect crystallization substantially of the $Na_2Cr_2O_7 \cdot 2H_2O$ content thereof, and wherein another part of the recovered so-evaporated and so-separated resultant solution substantially free from attendant precipitated $Na_2SO_4$ is recycled to the adding step as more highly concentrated sodium dichromate enriching solution.

14. Continuous process according to claim 1 for concentrating sodium dichromate solution which has been obtained by the reaction of sodium monochromate solution with sulfuric acid, which comprises continuously adjusting sodium dichromate dilute solution containing up to about 600 g./l. of $Na_2Cr_2O_7 \cdot 2H_2O$ and up to about 300 g./l. of $Na_2SO_4$ to an enriched concentration of at least about 800 g./l. of $Na_2Cr_2O_7 \cdot 2H_2O$, continuously concentrating at least a part of said resultant enriched solution obtained from the adding step by the step of continuously evaporating such obtained part of said resultant solution to precipitate concomitantly the remainder substantially of the $Na_2SO_4$ content thereof, and recycling at least a part of the so-evaporated resultant solution from the evaporating step to the adding step as more highly concentrated sodium dichromate enriching solution.

15. Process according to claim 14 wherein a part of said resultant enriched solution obtained from the adding step still containing precipitated $Na_2SO_4$ therein is recovered directly for use per se.

References Cited

UNITED STATES PATENTS 2,612,435  9/1952  Perrin et al. _____ 23—56 X
3,137,541  6/1964  Cooke _____ 23—56

H. T. CARTER, *Primary Examiner.*

U.S. Cl. X.R.

23—302

UNITED STATES PATENT OFFICE

CERTIFICATE OF CORRECTION

Patent No. 3,451,766　　　　　Dated June 24, 1969

Heinrich Schäfer et al.

It is certified that errors appear in the above-identified patent and that said Letters Patent are hereby corrected as shown below:

Column 4, line 54, after "solution" insert -- which -

Column 9, line 66, after "ered" insert -- per se is recovered --.

Column 10, line 9, at the right end of the diagram, "1.25C" should read -- 1.25D --.

Column 12, line 33, before "$Na_2SO_4$" insert -- solutio substantially free from attendant precipitated --.

SIGNED AND
SEALED
APR 28 1970

(SEAL)
Attest:

Edward M. Fletcher, Jr.
Attesting Officer

WILLIAM E. SCHUYLER, JR.
Commissioner of Patents